United States Patent [19]

Radebold

[11] 4,271,822
[45] Jun. 9, 1981

[54] CONVERSION OF AVAILABLE ENERGY

[76] Inventor: Reinhart Radebold, Quastenhornweg 14a, 1000 Berlin 22, Fed. Rep. of Germany

[21] Appl. No.: 951,180

[22] Filed: Oct. 13, 1978

Related U.S. Application Data

[62] Division of Ser. No. 545,133, Jan. 29, 1975, Pat. No. 4,127,453.

[30] Foreign Application Priority Data

Jan. 30, 1974 [DE]  Fed. Rep. of Germany ....... 2405134

[51] Int. Cl.³ .................. F24J 3/02; H01Q 15/20; G02B 5/10
[52] U.S. Cl. .................................. 126/426; 126/438; 350/296; 343/915
[58] Field of Search ...................... 126/426, 451, 438; 136/89 PC, 89 H; 350/295, 296; 343/840, 915

[56] References Cited

U.S. PATENT DOCUMENTS

| | | | |
|---|---|---|---|
| 2,412,466 | 12/1946 | Miller | 126/426 |
| 2,814,038 | 11/1957 | Miller | 126/451 |
| 3,125,091 | 3/1964 | Sleeper | 126/426 |
| 3,130,084 | 4/1964 | Loring | 126/451 |
| 3,130,466 | 4/1964 | Jones-Hinton | 350/295 |
| 3,326,624 | 1/1967 | Maydell | 343/915 H |
| 4,051,834 | 10/1977 | Fletcher | 126/426 |
| 4,126,123 | 11/1978 | Hall | 126/426 |

*Primary Examiner*—Samuel Scott
*Assistant Examiner*—G. Anderson
*Attorney, Agent, or Firm*—Smyth, Pavitt, Siegemund & Martella

[57] ABSTRACT

A flexible concave reflector having a solar energy absorbing means at the focus is maintained in its concave shape by an inflatable cushion on the convex surface and by a donut shaped chamber about the periphery of the reflector. The donut shaped chamber is maintained at high pressure and makes the entire structure lighter-than-air so that it may float above ground. The cushion is maintained at a low pressure and may be formed of a plurality of chambers. Additional support structure can be provided as disclosed.

12 Claims, 2 Drawing Figures

CONVERSION OF AVAILABLE ENERGY

BACKGROUND OF THE INVENTION

The present invention relates to a reflector for use in a system of the type described in my copending application Ser. No. 545,133, filed Jan. 29, 1975, now U.S. Pat. No. issued 4,127,453, of which this application is a division. The content of said patent is incorporated by reference in the present specification.

In accordance with the present invention, it is suggested to use a hollow, deployable circular reflector of rotational symmetry being supported by a tube coaxial thereto and having an extension that supports solar energy conversion devices disposed to receive the solar radiation as reflected by the mirror.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 shows a modular MHD system (=208), shown as an elongated tube 27. One of the units shown in detail in FIGS. 24 through 39 in the parent case may be contained in or constitute module 27, or a cluster thereof will be arranged as shown in FIG. 21 and may be contained in unit 27. The front portion of each such module (compartments A to D of FIG. 24, or portion 191 of FIG. 1 of the parent case) is contained in the focus 127 established either by the exposed outer skins 15 of the modules or by a "black" absorber covering that skin. The modules or tube 27 is held via tube 126 for support and protection. Reference numeral 128 refers to the air gaps through which air can enter into heat exchange at the low temperature side of the modules (see compartments S through Y, FIG. 38).

Figure 1:
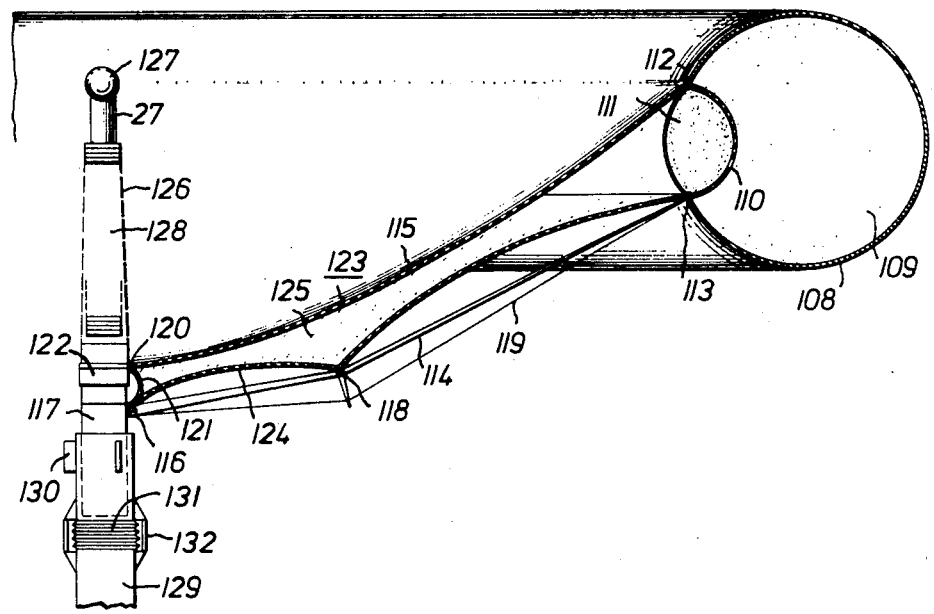
FIG. 1 is a sectional radial view of a mirror made from foils and stabilized by pressure differences.

The reflector is established by a reflecting foil 115 which constitutes the inner surface of the concave mirror as well as the top foil of a buoyoncy support structure. The periphery of the reflector is established by a hollow toroidal bead, hose or tube 108 with a diameter of 200 meter of the annulus and 30 m diameter of the circular cross-section of the toroid. Tube 108 is filled with hydrogen 109 for establishing the main buoyoncy. Tube 108 is strengthened on the inside by a chamber 110 filled with $H_2$ under higher pressure. Welding seam 113, between the wall of chamber 110 and tube 108 serves as anchoring points or line for the outer ends of support arms 114. A seam 112 is the boundary and connect point between mirror foil 115 and hose or bead 108.

Support arms 114 are pivotally mounted on a central support tube 117 by means of pivot joints 116. A second joint 118 of each arm is provided in about the middle thereof and is connected to a bottom foil 124 which connects also to joint 113. Arms 114 center the bead and are tensioned by cable 119.

A welding seam or connecting line 120 fastens the coil 115 to an annulus, ring or sleeve 122, a foil 121 is also fastened thereat. Annulus 122 is slidible positioned on tube 117 and can be moved up and down e.g. by means of a suitable drive and positioner for adjusting the reflector 115 in relation to the outer tube 108. In order to compell reflector foil 115 to assume the desired contour (parabolic), foils 115, 121 and 124 together constitute a cushion and pneumatically elastic backing 123 for the reflector foil. The connections 116, 118 and 113 support this cushion 123. Relatively low pressure therein sucks the foil 115 towards the inside. Points 120, 116, 118, 113 and 112 are all fixed position points in relation to which the foils curve inwardly.

As stated, central pipe 117 holds the MHD system 27 in a holder 126. The air exit and thermodynamic low temperature of the MHD system is established through air conduction through slots 128 of central pipe 117. Pipe 117 is placed into a pipe 129 to which one can connect the several inlet and outlet ducts for the fluids needed to operate the generator, e.g. water and/or hydrogen, while hydrazine is discharged therethrough.

The connection between 117 and 129 is a releasible one, so that the mirror can be collapsed and for example replaced by a different one, in case of damage and for repair or replacement. Bolts 130 permit the release. In order to orient the reflector towards the sun, tube 129 has a bellow like section 131 interposed. Spindles 132 bias the bellows axially but to a different extent thereby causing the entire assembly to tilt.

The reflector assembly including annulus 122 will be placed in position over the pipe 129, but central pipe 117 (to which the joint 116, arm 114 and lower foil 124 are fastened) is inserted into and secured to pipe 129 by means of the bolts 130. Next, tube 108 is inflated by introducing $H_2$ whereby the arms 114 are unfolded and the cushion 123 is deployed. The final contour of reflector foil 115 is established by means of adjusting ring 122.

Figure 2:
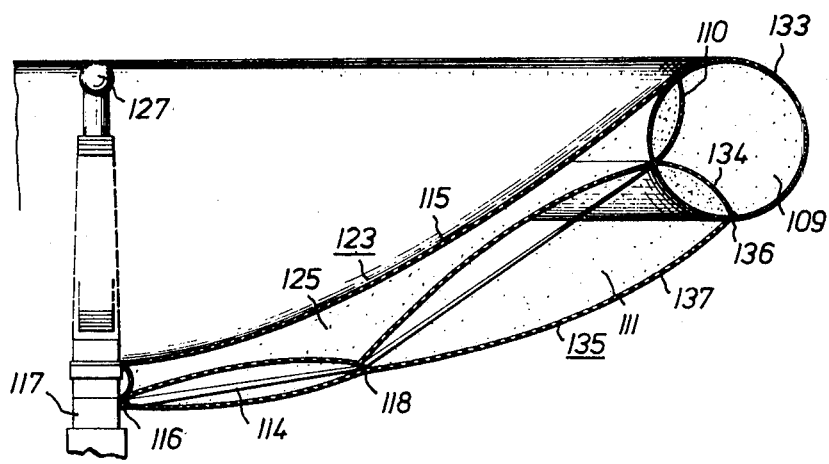
FIG. 2 is a sectional radial view of a modified mirror still being an example of the preferred embodiment.

FIG. 2 shows another version of the reflector construction which is actually preferred. Features common to both assemblies have been omitted. The difference arises from utilizing a smaller tube or hose 133 while a tensioning cushion 135 rather than the cable 119 of FIG. 40 are provided. Thus, one does not need mechanical operation of such cable.

The cushion 123 is deployed by inflating cushion 135 through injection of hydrogen 111. Since that cushion adds buyoncy, bead-hose 133 can be made smaller indeed. The tensioning cushion 135 is established on its upper side by lower foil 124 of the reflector cushion, while a tensioned foil 137 forms the lower side of cushion 135. Foil 137 is connected to tube 133 along a joint-seam 136. Cushion 135 is stabilized additionally by a compartment 134, and as to central pipe 117 the connection to foils 124 and 121 is made thereat. Pivot joints 118 are still needed in arms 114; the latter run through the inside of cushion 135 and are protected by the $H_2$ therein.

I claim:

1. In a system for converting solar energy into different forms of energy, comprising:
    a tubular, elongated housing, containing means for receiving and converting solar energy into a different form of energy;
    a curved reflector of rotational symmetry, being directly exposed to solar radiation, the housing being disposed along the axis of the reflector and traversing same, so that solar energy can be focussed onto said one end of the housing;

a gas-filled custioning means for the curved reflector and being under relatively low pressure to obtain a concave contour for said reflector by external pressure acting upon the cushioning means;

means including additional pressurized chamber means serving as a support structure and acting at least in parts along a periphery of the cushioning means, without covering the reflector, to stabilize and peripherally expand the cushioning means and the reflector, and to provide the system as a whole with buoyancy for floating aboveground; and a tube traversing the reflector, and being provided for supporting the reflector, the housing being inserted in said tube at its other end.

2. A system as in claim 1, the reflector constructed from deployed foils maintained under tension.

3. A system as in claim 1, the support structure having a peripherally extending hollow bead filled with light gas under pressure to stabilize the structure and support the cushioning means.

4. A system as in claim 1 or 5, the hollow support structure including chamber means being partitioned and filled with gas under pressure to obtain stabilization and backing of the cushioning means.

5. A system as in claim 3, including a plurality of stiff and strong support arms extending from said tube for holding the bead.

6. A system as in claim 3, wherein the reflector is constructed from foils, upper foils thereof providing the reflector proper, the foils establishing the cushioning means as backing for the reflector proper, the cushion means being secured to the bead.

7. A system as in claim 6, including support arms secured to the tube and holding at their ends the bead, the cushioning means being fastened at about midpoint of each arm, the cushioning means being additionally fastened to a ring which is telescoped on the tube.

8. A system as in claim 1, including support means for the system and means for tilting the reflector with housing.

9. A system as in claim 1, wherein plural housings each with separate conversion apparatus are clustered.

10. A solar energy reflector and collector for floating aboveground, comprising:

a low-pressure, gas-filled cushioning means having a particular reflective surface exposed to the outer atmosphere and being concavely deformed on account of the low pressure to establish a concave reflection of rotational symmetry and for focussing solar radiation;

an annular, high-pressure chamber affixed to a periphery of the low-pressure cushioning means, and expanding the cushioning means radially along the periphery thereof to stabilize the custioning means and to provide overall buoyancy for floating aboveground; and additional support means effective under the cushioning means to further stabilize the reflective surface and cushioning means.

11. A reflector as in claim 10, there being central support means, said additional support means including a plurality of radial support arms extending radially from central support means toward said periphery.

12. A reflector as in claim 10 or 11, said additional support means including additional, pressurized chamber means of higher pressure than the cushioning means and disposed underneath the cushioning means.

* * * * *